(12) United States Patent
Baron

(10) Patent No.: US 7,769,845 B2
(45) Date of Patent: Aug. 3, 2010

(54) METHOD AND SYSTEM FOR TERMINATING AN AUTHENTICATION SESSION UPON USER SIGN-OFF

(75) Inventor: Elad Baron, Cresskill, NJ (US)

(73) Assignee: Whale Communications Ltd, Rosh Ha'Ayin (IL)

( * ) Notice: Subject to any disclaimer, the term of this patent is extended or adjusted under 35 U.S.C. 154(b) by 653 days.

(21) Appl. No.: 10/139,587

(22) Filed: May 2, 2002

(65) Prior Publication Data

US 2002/0165971 A1    Nov. 7, 2002

Related U.S. Application Data

(60) Provisional application No. 60/288,770, filed on May 4, 2001.

(51) Int. Cl.
*G06F 15/173* (2006.01)
(52) U.S. Cl. .................. 709/224; 709/225; 709/227
(58) Field of Classification Search ......... 709/223–228, 709/203, 229
See application file for complete search history.

(56) References Cited

U.S. PATENT DOCUMENTS

| | | | | |
|---|---|---|---|---|
| 5,764,887 A | * | 6/1998 | Kells et al. .................... 726/14 |
| 5,884,312 A | | 3/1999 | Dustan et al. | |
| 5,928,363 A | * | 7/1999 | Ruvolo ........................ 726/22 |
| 6,070,243 A | * | 5/2000 | See et al. ........................ 726/2 |
| 6,119,167 A | * | 9/2000 | Boyle et al. ................. 709/234 |
| 6,226,752 B1 | | 5/2001 | Gupta et al. | |
| 6,272,538 B1 | * | 8/2001 | Holden et al. ................ 709/223 |
| 6,587,880 B1 | * | 7/2003 | Saigo et al. ................. 709/225 |
| 6,615,264 B1 | * | 9/2003 | Stoltz et al. ................. 709/227 |
| 6,671,729 B1 | * | 12/2003 | Gordon et al. .............. 709/227 |
| 6,715,082 B1 | * | 3/2004 | Chang et al. ................ 713/201 |
| 6,779,033 B1 | * | 8/2004 | Watson et al. ............... 709/227 |
| 6,862,638 B2 | * | 3/2005 | Witt ........................... 710/104 |
| 6,874,031 B2 | * | 3/2005 | Corbeil ....................... 709/229 |

* cited by examiner

*Primary Examiner*—Faruk Hamza
(74) *Attorney, Agent, or Firm*—Lee & Hayes, PLLC

(57) ABSTRACT

An authentication component resides between a server and a client, or on a server, and monitors one or more transactions communicated between the server and the client. When the authentication component detects a transaction that contains a termination indication, the authentication session is terminated, forcing the client to re-authenticate the next time a transaction with the server is desired. The termination indication may have been provided by an application running on the server, or alternatively, the termination indication may be provided by the authentication component.

36 Claims, 4 Drawing Sheets

FIG. 1  INITIATION OF SESSION/SESSION VERIFICATION

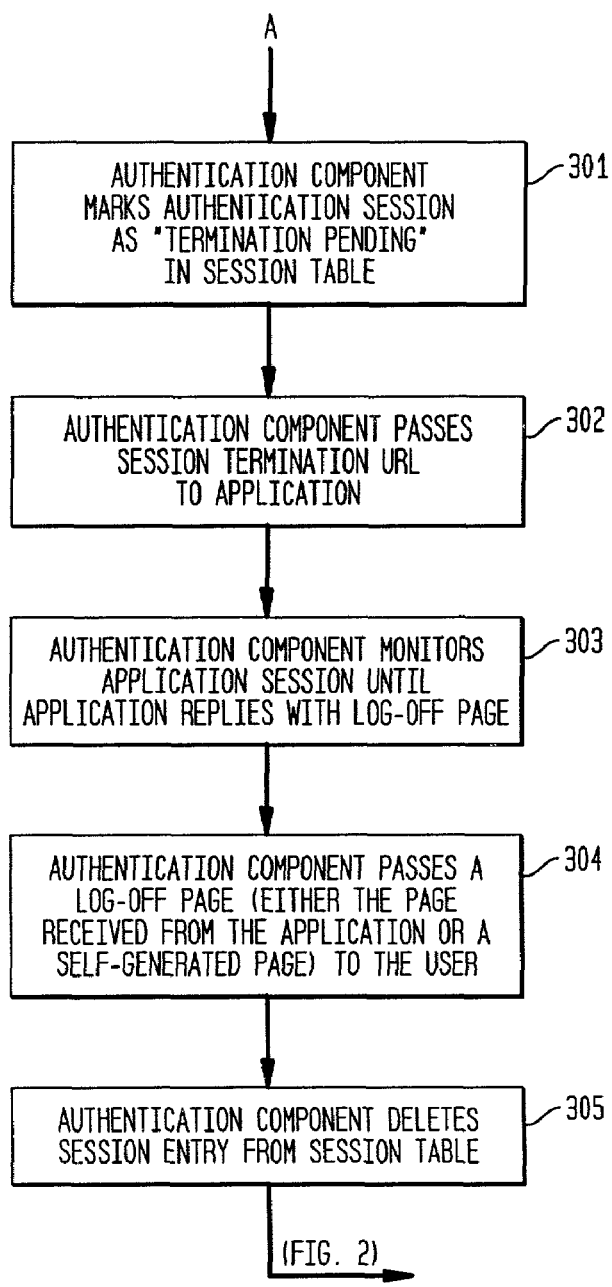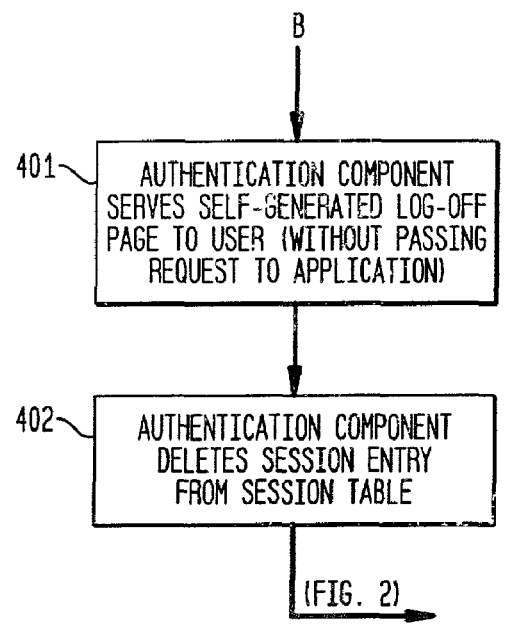

METHOD AND SYSTEM FOR TERMINATING AN AUTHENTICATION SESSION UPON USER SIGN-OFF

CROSS REFERENCE TO RELATED APPLICATIONS

This application claims the benefit of U.S. Provisional Patent Application No. 60/288,770 filed on May 4, 2001, the entire disclosure of which is incorporated herein by reference.

TECHNICAL FIELD

The present disclosure relates to a system and method for ensuring integrity of user sessions, and more particularly, to a system and method for terminating an authentication session immediately upon the authenticated user's manifestation of the user's intention to sign off from or terminate his interaction with the application.

BACKGROUND

It is generally necessary for modern Web-based applications to maintain a "session". A "session" means a sequence of transactions, i.e., requests and responses sent back and forth between the Web-based application or Web server and the user. This need to maintain a session arises because Web-based applications use the HTTP protocol, which is by itself a stateless protocol, meaning that each request-response pair is independent of previous ones. This session will often be referred to as an "application session" herein.

In order to maintain an application session, some type of "token" or "ticket" must be passed by the Web browser each time a request is sent to the application in order for the application to associate this request with the specific application session. Since the token remains the same in all subsequent client requests, the application identifies all such requests as part of the same application session. A "cookie" is the most commonly used type of token for this purpose, although other alternatives exist, including using a specific URL parameter as the token. In addition to serving as an application session identifier, this token sometimes contains some additional application session information.

In order to authenticate the user, a software component may be implemented which resides between the user and the Web server and authenticates the user at the beginning of each session. Authentication is often accomplished by challenging the user to provide some credentials unknown to other users. These credentials could be in the form of passwords, client certificates, or readouts from some physical devices that the user carries and can be verified at the server side. This authentication component can be implemented as a proxy, filter, or other agent well known to those skilled in the art. For example, a software component residing in front of the Web server and receiving requests on behalf of the server, and eventually passing the requests to the server and the responses from the server back to the client may be implemented. As an additional example, a software component residing on the Web server that interacts with the Web server in order to modify and/or control the request/response data-flow may be implemented.

Like the application as described above, the authentication component must also keep track of the user's session in order to preclude the need to re-authenticate the user every time a request is sent. Being in the middle of the data path between the user and the application, the authentication component could theoretically accomplish this by tracing the application session tracking process, for example, by verifying that the cookie described above continues to be passed to the application. In reality, however, it usually accomplishes this via independent session tracking, using similar mechanisms. For example, a different cookie is issued by the authentication component, which is used either as a session identifier or as an encrypted authentication approval ticket (i.e., presenting this ticket along with a request approves the request). This is described in more detail in the following paragraph. As a result, re-authentication is necessary only when a new session with this authentication component is initiated. For the sake of clarity, this session will be referred to as an "authentication session" herein.

In the case of an authentication session maintained by means of a cookie or token used as a session identifier, the authentication component issues a cookie or other token to the client such as the Web browser upon the user's first request. The user's first request typically does not contain a valid token/cookie. The cookie or token issued by the authentication component contains a random number. The random number should be large enough to prevent "brute force" attacks, which attempt to find the value by guessing, from succeeding within a reasonable amount of time. The random number is used internally at the authentication component to identify an entry in a session table using a hashing algorithm. This session table contains all active sessions currently being maintained by the authentication component. In the case of an authentication session maintained by means of an encrypted authentication approval ticket, or encrypted token/cookie, whatever information would be stored in the session table described above is instead encrypted in the cookie that is sent back and forth between the browser and the authentication component together with each request and response. The authentication component uses a cryptographic key, which is unknown outside the scope of the authentication component, and it adds some fixed "salt" value to the information encrypted, which is used to verify a legitimate cookie upon decryption.

An issue exists with regards to termination of the authentication session. Once a user is authenticated at a terminal, it is assumed that all subsequent requests that that terminal issues come from that authenticated user. Accordingly, it is critical that when the user finishes his interaction with the application, the authentication session terminates, so that a new user at that terminal will not be mistakenly assumed to be already authenticated. This is particularly important when the user is logging in from public spaces such as Internet cafes, airports, etc. Since there is no standard method of logging off from a Web-based application, most authentication mechanisms utilize some form of a "time-out" mechanism, whereby if a user does not interact with the application for a certain amount of time, for example, 10 minutes, the authentication session expires. Alternatively, some authentication mechanisms implement a fixed time-out, which allows the session to stay alive for a certain amount of time, regardless of user activity. However, such mechanisms are inadequate in public spaces where a stranger can take control of the browser a moment after a legitimate user has ostensibly signed off. This problem is exacerbated where public Internet access facilities "lock down" their browsers (i.e., the browser cannot be closed), since in that case the user cannot even terminate the session by closing the browser (which would typically discard its cookies when closed).

Moreover, despite the fact that an application may contain some type of log-off button or URL which is intended to terminate the application session (not to be confused with the authentication session), such termination typically would have no effect on the authentication mechanism because existing authentication mechanisms are unaware of the application's log-off mechanism, and therefore the authentication mechanism would not terminate the authentication session. As a result, the next person using the same browser could be implicitly authenticated by the authentication component since a legitimate cookie would be sent to the authentication component. This would allow a malicious user to interact with the supposedly protected application (even though engaging possibly in a new application session) without first authenticating his identity via the authentication component's authentication mechanism. Thus, while the application may have its own authentication feature (e.g., a user name and password) which would provide some level of protection against this malicious user, the superior authentication provided by the authentication component's authentication mechanism would be bypassed. In the case of an application that provides HTTP Basic Authentication, the potential to bypass the authentication component's authentication mechanism would leave the application particularly vulnerable, since there exists an inherent vulnerability in HTTP Basic Authentication resulting from the fact that the Web browser saves the user names and passwords of previous users who have accessed a site.

Therefore, it is highly desirable to have a system and method for allowing an immediate authentication session termination when the legitimate user signs off. In addition, it is also desirable that this system and method allow immediate session termination even if the application itself does not inherently support a sign-off feature.

SUMMARY

A system and method, and/or a program storage device, for terminating an authentication session immediately following the user's manifestation of his intention to terminate his interaction with an application is provided. In one aspect, user's requests are monitored until a pre-defined URL is requested by the user. The authentication session after such URL is requested is then terminated. This URL may be either a pre-existing URL in the application, or a URL presented by the authentication component for this purpose.

BRIEF DESCRIPTION OF THE DRAWINGS

Preferred embodiments will now be described, by way of example only, with reference to the accompanying drawings. Like reference numbers indicate identical or functionally similar elements.

FIG. 3 is a flow diagram illustrating an example of terminating an authentication session in one embodiment when an application provides a session termination procedure;

FIG. 4 is a flow diagram illustrating an example of terminating an authentication session in one embodiment when an application does not provide a session termination procedure.

DETAILED DESCRIPTION

Figure 1:
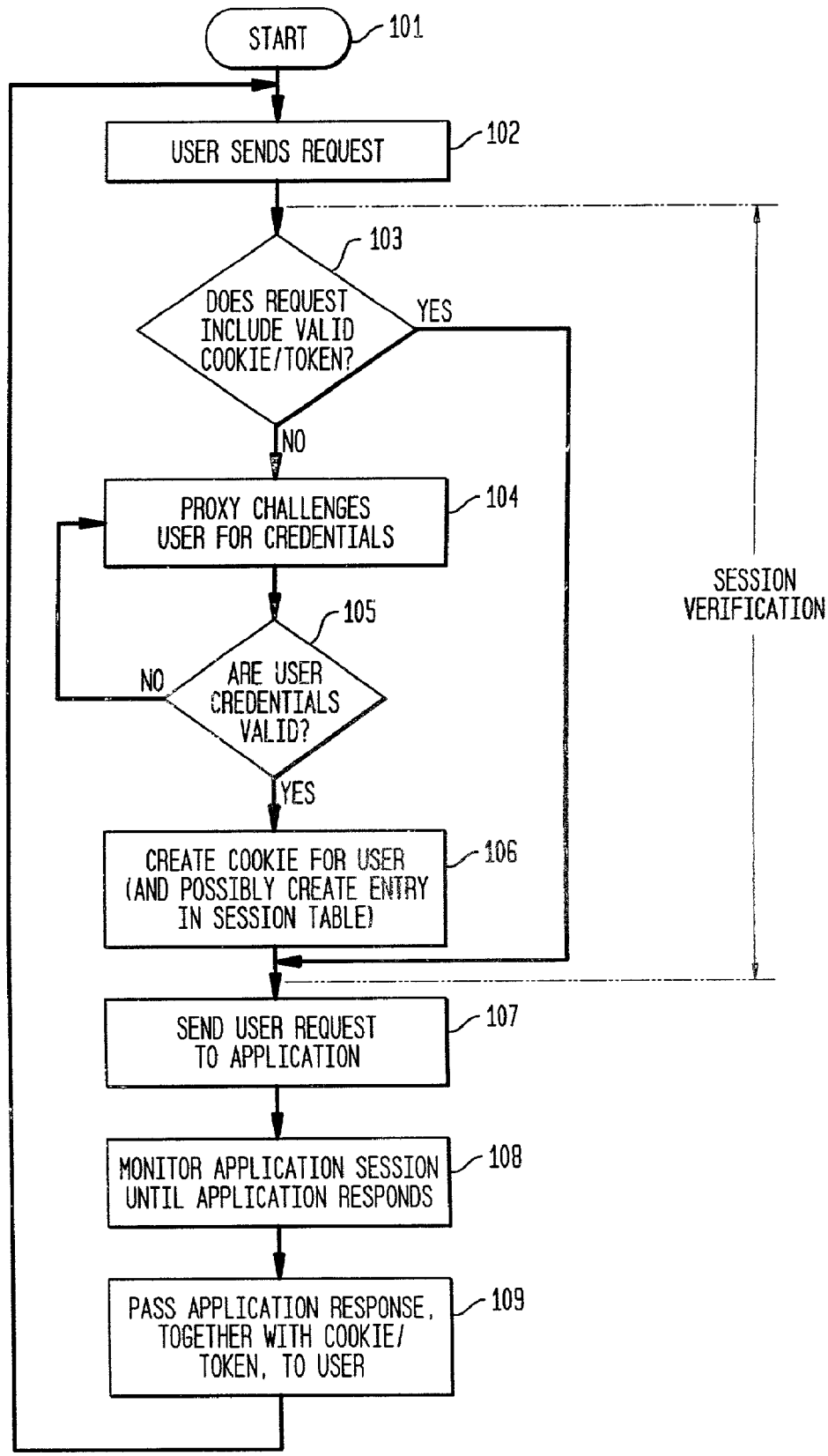
FIG. 1 is a flow diagram illustrating an example of initiating a typical authentication session in one embodiment.

Typically, a session table that is maintained at an authentication component contains all active sessions currently being maintained by the authentication component. If an entry in the session table is deleted, or marked "expired," the session is effectively broken, since a new request by the client does not carry a valid cookie (or other token). That is, the cookie content does not map anymore to an active entry in the session table, and therefore the new request would force a re-authentication of the user. The authentication process itself involves getting some credentials from the user and verifying them against some expected values before proceeding to create a corresponding entry in the session table. This process of checking the user's credentials is described in U.S. Pat. Nos. 5,097,505, 5,168,520, and 5,657,388.

Since an authentication component typically receives all HTTP requests from the client and passes them to the Web server, the authentication component can make decisions based on the content of these requests. In one embodiment, the authentication component monitors these requests, and when it detects a manifestation by the user of the user's intention to terminate his interaction with the application (a "termination indication"), the authentication component initiates a session termination sequence, which results in the deletion of the relevant entry from the session table, thereby rendering the authentication session expired. The termination indication may take the form a request for a specific URL, for example, which was pre-defined at authentication component configuration. Such URL shall be referred to as the "authentication session termination URL". If the application itself happens to provide the user with some type of log-off button or URL which is intended to terminate the application session (not to be confused with the authentication session), then this same URL may serve as the authentication session termination URL. This, as well as the scenario in which the application does not provide such a log-off mechanism, will be described in further detail in the following paragraphs.

In one aspect, an authentication component residing between the user and the application may take the form of a proxy implementation, a filter implementation, or another agent well known to those skilled in the art. Solely for the sake of explanation, in the following description the method and system is often described in the context of a proxy implementation. Those skilled in the art of computer programming, however, will appreciate that the implementation need not be in the form of proxy only. A proxy generally authenticates a user upon the first attempt by the user to reach the application, from which point the proxy maintains an authentication session. A system and method provided terminates this session immediately following the user's ending an interaction with the application. The system and method provided may be used alone as an alternative to, or supplement the conventional methods described above that are based on inactivity or scheduled timeouts.

FIG. 1 is a flow diagram illustrating an example of initiating a typical authentication session in one embodiment. At 102, a user tries to initiate a session by sending a request to an application. At 103, an authentication component, for example, proxy, inspects this request to determine whether it includes a valid cookie or token. If not, then the authentication component challenges the user to provide authentication credentials at 104. At 106, if the credentials are valid, then the authentication component creates a new cookie or other token for the user for this session. The authentication component may alternatively create a corresponding entry in the session table. At 107, the authentication component forwards the user request to the application, and at 108, monitors the application session until the application responds. At 109, when the application responds the authentication component attaches the cookie to the response and passes this to the user. Subsequent requests are similarly inspected to verify that they contain a valid token. Thus, the authentication component also forwards any subsequent user requests carrying a valid cookie/token to the application.

Figure 2:
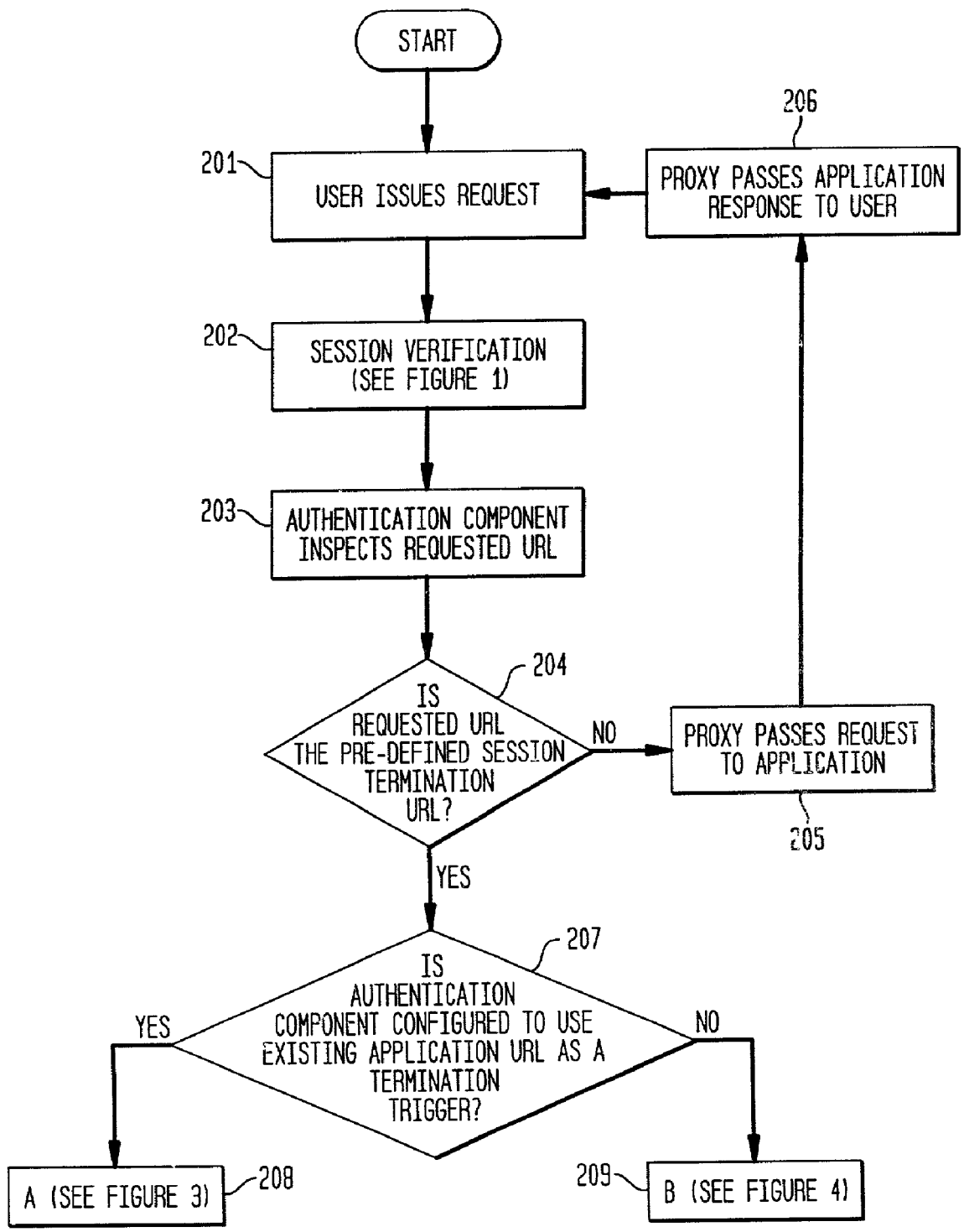
FIG. 2 is a flow diagram illustrating an example of monitoring for authentication termination requests in one embodiment.

FIG. 2 is a flow diagram illustrating an example of monitoring for authentication termination requests in one embodiment. Once a session has been verified at 202, for example, as described with reference to FIG. 1, the authentication component inspects every user request as shown at 203 to determine whether the request is for the authentication session termination URL as shown at 204. If it is not, at 205, the authentication component continues to pass the requests to the application. Once the authentication session termination URL is requested, however, the authentication component begins the session termination sequence.

This sequence may vary depending, inter alia, on whether the application itself provides for a log-off button or other URL which is intended to terminate the application session or otherwise is identified as the application session termination URL. Accordingly, at 207, depending on whether the authentication component was configured to use an existing application URL as a termination trigger, the processing then continues as will be described with reference to FIGS. 3 and 4.

In one embodiment, if an application itself provides a termination procedure such as a log-off URL, the application-provided URL may be configured at the proxy and used as an authentication session termination URL. Accordingly, at 208, the processing continues to FIG. 3. FIG. 3 is a flow diagram illustrating an example of terminating an authentication session in one embodiment when an application provides a session termination procedure. In one embodiment, if an application has an embedded "log-off" or other URL, the authentication component predetermines this URL as an authentication session termination URL. The authentication component then monitors the user requests for this predetermined URL. When the authentication component detects a request for the authentication session termination URL, the authentication component marks the authentication session as "termination pending" in the session table as shown at 301. At 302, the authentication component passes the URL request to the application. At 303, the authentication component monitors the application session until the application responds with the page corresponding with such request, for example, its log-off page. At 304, the authentication component passes a log-off page-either the application's logoff page received from the application or a log-off page generated by the authentication component which authentication component discards the application's log-off page-to the user and then immediately terminates the authentication session by deleting the corresponding session entry from the session table at 305. New user requests are now forced to re-authenticate, for example, as per FIG. 1.

In one embodiment, if the reply, for example, the application's log-off page, itself contemplates additional requests and responses, such as images, etc., then the session may be terminated either (i) immediately (ii) after a pre-defined set of requests and/or responses have been made (this set may be defined using lists of URLs, regular expressions, MIME types, file extensions, or any other content-based rules); (iii) after a pre-defined number of requests and/or responses have been made; or (iv) immediately after the first request is made that does not fit within a pre-defined set of requests (an "invalid request").

Alternatively, as soon as the authentication session termination URL is requested by the user, the authentication component, for example, a proxy, may terminate the session by deleting its entry from the session table, without first passing this URL request to the application. In one aspect, a proxy may terminate the session immediately after passing the URL request to the application, without waiting for the application to reply with its response.

Additional improvements to this process may include any or a combination of the following described features. For example, a timeout restriction feature may be included. This feature would automatically break an authentication session after a pre-defined period of time after the request for the authentication session termination URL is submitted by the user. This timeout restriction would occur, for example, even if the application response, for example, the log-off page, does not come or not all of the additional allowed requests/responses arrive. This timeout restriction may be implemented in one embodiment by storing a time stamp value at the time when the session entry of "termination pending" is entered. Thereafter, the time stamp value may be monitored either periodically or on each following user request. When the predefined time period passes, a proxy may delete the session entry. The timeout restriction may also be implemented by triggering a scheduled interrupt which when activated, deletes the session entry if the entry is still active.

Additional features may include data traffic restrictions. For example, a proxy may disallow the passage of any new user requests while in "termination pending" mode, except requests and corresponding responses that are part of the application's response to the authentication session termination URL, such as images, etc. This may be achieved by monitoring subsequent requests and rejecting (i.e., not forwarding to the application) any request other than a pre-defined set of requests. This set may be defined using lists of URLs, regular expressions, MIME types, file extensions, or any other content-based rules. If the application's log-off page does not provide for any subsequent requests or responses, then a proxy may simply disallow the passage of any user requests once the log-off request has been made.

Yet another feature may include data traffic restrictions with proxy-generated responses. With this feature, when a proxy detects that the user has requested the authentication session termination URL, the proxy generates and serves its own log-off page or similar response to the user and does not pass (but rather discards) any application-generated response to the user. The proxy may still pass the authentication session termination URL to the application. The proxy-generated log-off page may include additional images and options. The proxy then acts as the server with respect to this log-off page and requests and responses related thereto. Thus, once the log-off request has been made by the user, the proxy may disallow the passage of any new requests from the user to the application; however, it continues to respond to requests that are part of the proxy-generated log-off page, such as images, etc., by serving the pages that correspond to those requests.

Alternatively, or in addition, once the log-off request has been made by the user, the proxy can be pre-configured to act as a client, emulating the user, with respect to the application by engaging in certain requests and responses with the application (without necessarily passing any responses to the user). At the same time or alternatively, the proxy may act as a server with respect to the user, providing responses to the user that may or may not be identical to those provided by the application.

As an alternative to using the cookie or other token to identify an entry in a session table as described above, the method can be similarly implemented in the case of an authentication session maintained by use of an encrypted token/cookie. In that case, the termination of the authentication session would be accomplished not by deleting an entry from a session table but by one of the following methods: (i) the proxy instructs the browser to stop sending the cookie; or (ii) the proxy enters the cookie content into a table that contains all disallowed cookies, such that any cookie whose content maps to such table is thus identified as an invalid cookie, thereby forcing a re-authentication of the user whose request included that cookie.

FIG. 4 is a flow diagram illustrating an example of terminating an authentication session in one embodiment when an application does not provide a session termination procedure. Where the application does not have any embedded "log-off" or similar URL, the authentication component, having detected a request for the authentication session termination URL, does not pass this request to the application but instead serves its own pre-configured logoff page to the user as shown at 401. At 402, the authentication component then immediately terminates the authentication session by, for example, deleting the corresponding session entry from the session table. New user requests are now forced to re-authenticate, for example, as per FIGS. 1 and 2.

In one embodiment, a proxy may monitor all of the responses coming from the Web server to the browser during the application session. Before passing each HTTP response to the browser, the proxy may add, for example, a "button" to the HTML portion of the response. The button, which would appear to the user as a "log-off" or similar button, may be added either only to pre-defined specific pages, or to all HTML pages. Alternatively, the proxy can make use of "frames" and, for example, append a frame to the first HTML page requested by the user, and include this button or similar mechanism within such frame. This button contains, for example, a reference, or link, to the authentication session termination URL. Once the user clicks on this link, a request with that URL is transmitted. The proxy receives the URL before it reaches the server.

Alternatively, a proxy may not add any button to the server's responses, but the proxy may still monitor the user's requests for a specific pre-defined URL. A user is, for example, given the pre-defined URL to use for terminating a session. The user, for example, may type the URL manually. Regardless of how the user requests this authentication session termination URL, i.e., by clicking a link or by typing it, or in some other manner, the proxy detects this URL request before the request reaches the server and sends back a pre-defined response page, in the form of a log-off page, to the user. It then breaks the authentication session immediately. The proxy does not pass this URL request to the application as in the previous case, since the application is not aware of this URL. As described above, the application is not aware of this URL since such URL was either added by the proxy to the response after the response left the application, or such URL was manually requested by the user.

Additionally, a data traffic restriction together with a proxy-generated response, as described above, may be implemented. If the proxy-generated log-off page includes additional images and options, then the session may be terminated either (i) immediately after the log-off page is served to the user; (ii) after a pre-defined period of time after the request for the authentication session termination URL is submitted by the user; (iii) after a pre-defined set of requests and/or responses have been made, which set may be equivalent to, or may be a subset of, the entire set of possible requests and responses contemplated by the proxy-generated log-off page; or (iv) after a pre-defined number of requests and/or responses have been made, which number may equal, or may be lower than, the entire number of possible requests and responses contemplated by the proxy-generated log-off page.

Figure 5:
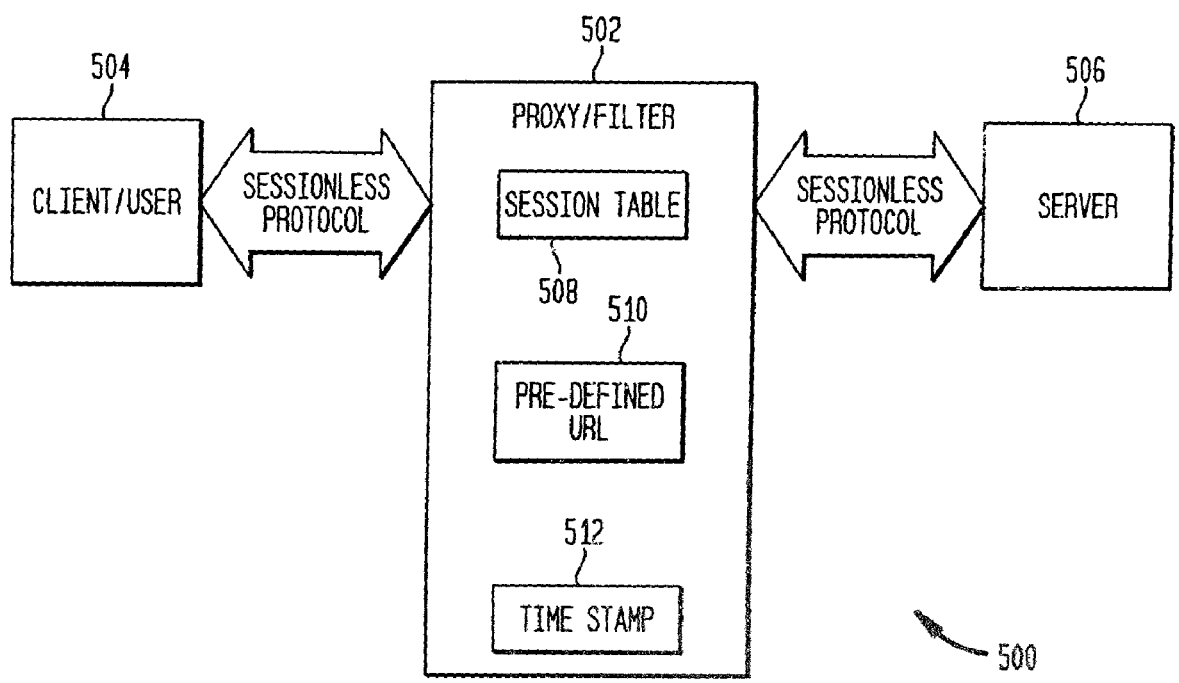
FIG. 5 is a diagram illustrating various components in the system for terminating an authentication session.

FIG. 5 is a diagram illustrating components of the authentication session termination system in one embodiment. An authentication component, for example, a proxy or filter, resides between a client 504 and a server 506. The authentication component may include a session table 508 for storing sessions in progress for each client. The session table may also include a pre-defined URL 510 that indicates that a session should be terminated. The session table may also include a timestamp 512. As will be appreciated by those skilled in the art of computer programming, the data in the session table, pre-defined URL, and time stamp may be organized as row and columns of a table, as separate tables with links into one another, as a data structure or linked list format, or any other data storage method known. The authentication component 502 may reside with the server 506 or as a part of client system 504 or run between the server 506 and the client 504. The authentication component 502 monitors requests and responses communicated between the client 504 and the server 506, and when a pre-defined URL is detected, the authentication component proceeds to terminate the session, for example, according to embodiments described with reference to FIGS. 1-4.

Although the description of the system and method herein has been presented in the context of a proxy implementation solely for the sake of explanation, other components such as filters may be used to implement the system and method disclosed, including claimed improvements, alternatives and modifications thereto. In addition, although the system and method for terminating an authentication session is described herein with respect to the World Wide Web and HTTP transactions, those skilled in the technological art will appreciate that the present system and method may also be used in any other transactions and protocols where beginning and end of sessions are not maintained by client or server systems. Moreover, while the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims.

I claim:

1. A method for terminating an authentication session following a user's indication that the user intends to terminate the user's interaction with an application comprising:

monitoring, by a computer, transactions between the user and the application to detect a request which serves as a predefined termination indication, wherein the monitoring is performed by an authentication component which receives requests from the user and relays them to the application;

detecting the request which serves as the termination indication in one of the monitored transactions;

marking an authentication session as termination pending in a session table;

communicating the request which serves as the termination indication to the application;

presenting in response to receiving the termination indication a preconfigured logoff page provided by the authentication component to the user that includes additional options for the user;

intercepting one or more transactions from the user after presenting the preconfigured logoff page;

responding to the one or more transactions before terminating the authentication session;

continuing to monitor the transactions between the user and the application until the application replies with a response to the termination indication;

terminating the authentication session in response to detecting the termination indication, the terminating is performed by the authentication component, and wherein only predetermined transactions are permitted between the detecting and the terminating;

after detecting the response which serves as the termination indication, blocking, by the authentication component, any further response from the application; and relaying to the application any request made between the detecting and the terminating which is in a pre-defined set of requests.

2. The method of claim 1, wherein the terminating includes deleting an entry associated with the authentication session from the session table.

3. The method of claim 1, wherein the terminating includes marking a session entry in an authentication session table as expired.

4. The method of claim 1, wherein the terminating includes denoting an encrypted token associated with the authentication session as invalid.

5. The method of claim 1, wherein the terminating includes entering a session cookie associated with the authentication session into a table of disallowed cookies.

6. The method of claim 1, wherein the terminating includes terminating the authentication session after predetermined period of time has passed after detecting the termination indication.

7. The method of claim 6, wherein the terminating includes allowing only a predetermined set of transactions to be communicated between the user and the application during the predetermined period of time.

8. The method of claim 6, wherein the terminating includes, after receiving the termination indication, terminating the authentication session upon the earlier of the expiration of the predetermined period of time or an invalid request is received from the user.

9. The method of claim 1, wherein the terminating includes terminating the authentication session after a first request is received from the user that is not among a predefined set of allowed requests or is one of a predefined set of disallowed requests.

10. The method of claim 1, wherein the terminating includes:
denoting the authentication session as termination pending; and
allowing one or more pre-defined URL requests and responses to and from the user and the application.

11. The method of claim 10, wherein the one or more predefined URL requests and responses include one or more requests and responses used for the application's logoff sequence.

12. The method of claim 1, further comprising allowing only selected, pre-defined requests from the user to the application after the presenting and before terminating.

13. A computing device comprising:
a processor; and
a memory coupled to the processor, the memory comprising computer-program instructions executable by the processor for:
monitoring transactions between a user and an application to detect a request which serves as a predefined termination indication, wherein the monitoring is performed by an authentication component which receives requests from the user and relays them to the application;
detecting the request which serves as the termination indication in one of the monitored transactions;
marking an authentication session as termination pending in a session table;
communicating the request which serves as the termination indication to the application;
presenting in response to receiving the termination indication a preconfigured logoff page provided by the authentication component to the user that includes additional options for the user;
intercepting one or more transactions from the user after presenting the preconfigured logoff page;
responding to the one or more transactions before terminating the authentication session;
continuing to monitor the transactions between the user and the application until the application replies with a response to the termination indication;
terminating the authentication session in response to detecting the termination indication, the terminating is performed by the authentication component, and wherein only predetermined transactions are permitted between the detecting and the terminating;
after detecting the response which serves as the termination indication, blocking, by the authentication component, any further response from the application; and
relaying to the application any request made between the detecting and the terminating which is in a pre-defined set of requests.

14. The computing device of claim 13, wherein the terminating includes deleting an entry associated with the authentication session from the session table.

15. The computing device of claim 13, wherein the terminating includes marking a session entry in an authentication session table as expired.

16. The computing device of claim 13, wherein the terminating includes denoting an encrypted token associated with the authentication session as invalid.

17. The computing device of claim 13, wherein the terminating includes entering a session cookie associated with the authentication session into a table of disallowed cookies.

18. The computing device of claim 13, wherein the terminating includes terminating the authentication session after predetermined period of time has passed after detecting the termination indication.

19. The computing device of claim 18, wherein the terminating includes allowing only a predetermined set of transactions to be communicated between the user and the application during the predetermined period of time.

20. The computing device of claim 18, wherein the terminating includes, after receiving the termination indication, terminating the authentication session upon the earlier of the expiration of the predetermined period of time or an invalid request is received from the user.

21. The computing device of claim 13, wherein the terminating includes terminating the authentication session after a first request is received from the user that is not among a predefined set of allowed requests or is one of a predefined set of disallowed requests.

22. The computing device of claim 13, wherein the terminating includes:
denoting the authentication session as termination pending; and
allowing one or more pre-defined URL requests and responses to and from the user and the application.

23. The computing device of claim 22, wherein the one or more predefined URL requests and responses include one or more requests and responses used for the application's logoff sequence.

24. The computing device of claim 13, further comprising allowing only selected, pre-defined requests from the user to the application after the presenting and before terminating.

25. One or more processor-accessible storage media comprising processor-executable instructions that, when executed, cause a device to perform actions comprising:
   monitoring transactions between a user and an application to detect a request which serves as a predefined termination indication, wherein the monitoring is performed by an authentication component which receives requests from the user and relays them to the application;
   detecting the request which serves as the termination indication in one of the monitored transactions;
   marking an authentication session as termination pending in a session table; communicating the request which serves as the termination indication to the application;
   presenting in response to receiving the termination indication a preconfigured logoff page provided by the authentication component to the user that includes additional options for the user;
   intercepting one or more transactions from the user after presenting the preconfigured logoff page;
   responding to the one or more transactions before terminating the authentication session;
   continuing to monitor the transactions between the user and the application until the application replies with a response to the termination indication;
   terminating the authentication session in response to detecting the termination indication, the terminating is performed by the authentication component, and wherein only predetermined transactions are permitted between the detecting and the terminating;
   after detecting the response which serves as the termination indication, blocking, by the authentication component, any further response from the application; and
   relaying to the application any request made between the detecting and the terminating which is in a pre-defined set of requests.

26. The one or more processor-accessible storage media of claim 25, wherein the terminating includes deleting an entry associated with the authentication session from the session table.

27. The one or more processor-accessible storage media of claim 25, wherein the terminating includes marking a session entry in an authentication session table as expired.

28. The one or more processor-accessible storage media of claim 25, wherein the terminating includes denoting an encrypted token associated with the authentication session as invalid.

29. The one or more processor-accessible storage media of claim 25, wherein the terminating includes entering a session cookie associated with the authentication session into a table of disallowed cookies.

30. The one or more processor-accessible storage media of claim 25, wherein the terminating includes terminating the authentication session after predetermined period of time has passed after detecting the termination indication.

31. The one or more processor-accessible storage media of claim 30, wherein the terminating includes allowing only a predetermined set of transactions to be communicated between the user and the application during the predetermined period of time.

32. The one or more processor-accessible storage media of claim 30, wherein the terminating includes, after receiving the termination indication, terminating the authentication session upon the earlier of the expiration of the predetermined period of time or an invalid request is received from the user.

33. The one or more processor-accessible storage media of claim 25, wherein the terminating includes terminating the authentication session after a first request is received from the user that is not among a predefined set of allowed requests or is one of a predefined set of disallowed requests.

34. The one or more processor-accessible storage media of claim 25, wherein the terminating includes:
   denoting the authentication session as termination pending; and
   allowing one or more pre-defined URL requests and responses to and from the user and the application.

35. The one or more processor-accessible storage media of claim 34, wherein the one or more predefined URL requests and responses include one or more requests and responses used for an application's logoff sequence.

36. The one or more processor-accessible storage media of claim 25, further comprising allowing only selected, pre-defined requests from the user to the application after the presenting and before terminating.

* * * * *